(No Model.)

A. BARNES.
RUNNING GEAR FOR WAGONS.

No. 251,687. Patented Jan. 3, 1882.

Attest:
A. Barthel
E. Scully

Inventor:
Amos Barnes
per Thos. S. Sprague
Att'y

United States Patent Office.

AMOS BARNES, OF PONTIAC, MICHIGAN, ASSIGNOR TO HIMSELF, JUNIUS TEN EYCK, AND THOMAS B. DUNSTAN, OF SAME PLACE.

RUNNING-GEAR FOR WAGONS.

SPECIFICATION forming part of Letters Patent No. 251,687, dated January 3, 1882.

Application filed October 26, 1881. (No model.)

*To all whom it may concern:*

Be it known that I, AMOS BARNES, of Pontiac, in the county of Oakland and State of Michigan, have invented an Improvement in Wagons, of which the following is a specification.

The nature of this invention relates to certain new and useful improvements in the construction of wagons, wherein the employment of a sway bar is done away with, thereby avoiding strain upon the reach and the danger of breaking the same, while at the same time the forward axle, to which my device is attached, is materially strengthened; and the invention consists in the peculiar construction, arrangement, and combinations of the various parts, all as more fully hereinafter set forth.

Figure 1:
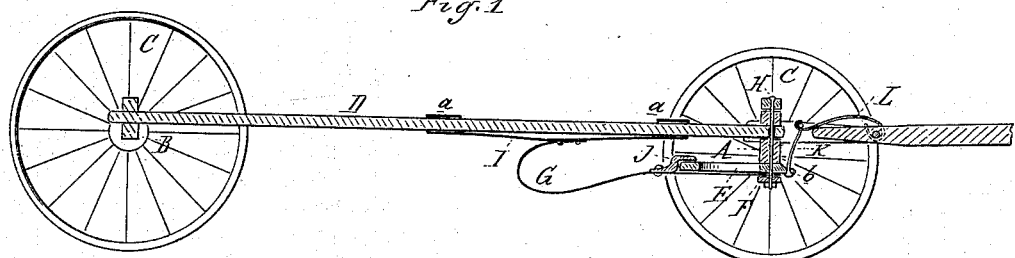
Figure 3:
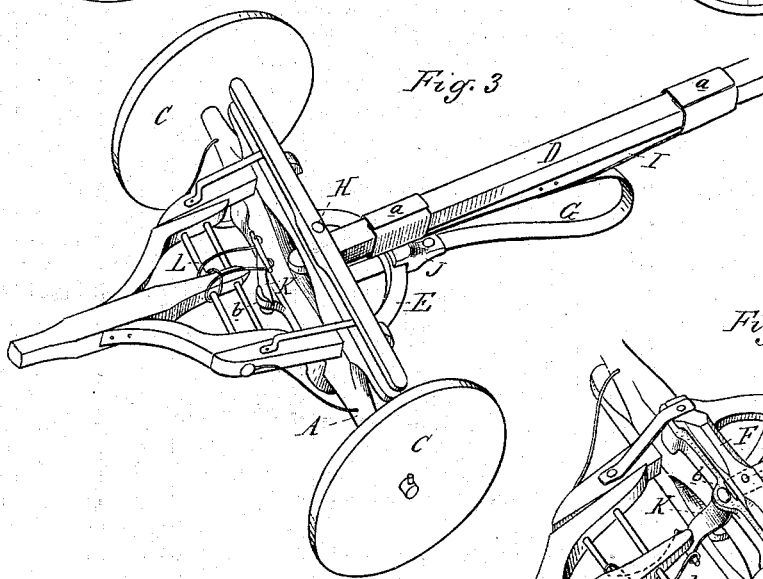
Figure 2:
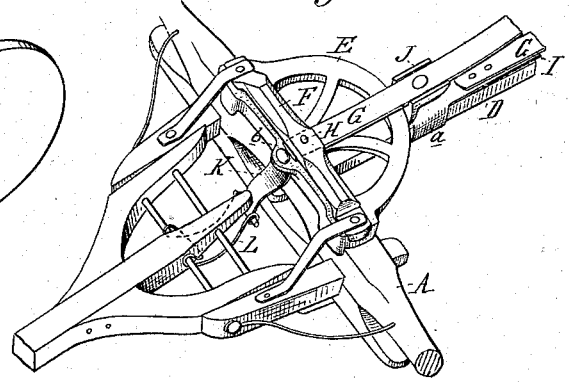

Figure 1 is a longitudinal section. Fig. 2 is a detached perspective from the under side of the forward axle, and Fig. 3 is a similar view from the top.

In the accompanying drawings, which form a part of this specification, A represents the forward axle, B the rear axle, C the wheels, and D the reach which connects the two axles together, as in the ordinary manner.

E represents the fifth-wheel, which is secured to the under side of the forward axle, A, by means of the truss-bar F and suitable bolts.

G is a leaf-spring, one end of which is pivotally secured between the truss-bar F and the fifth-wheel E by means of the king-bolt H, which also passes through the forward end of the reach and through the axle and bolster, as in the ordinary manner. This spring G extends rearward, and the rear end is bent forward, as shown, and is secured to a bar, I, which is provided at each end with loops a, through which the reach D passes. Upon this spring G is secured a guide, J, the free end of which extends forward over the face of the fifth-wheel, thereby retaining such wheel and the spring in their relative positions. A stud, b, projecting forward from the fifth-wheel plate, is provided with the T-headed bar K, with which engage the hook ends of the spring L, which is secured to the tongue-hounds in such a manner that the force of the spring will keep the outer end of the tongue in an elevated position, and relieve the weight of the same upon the necks of the horses.

By this construction of parts it will be observed that the employment of sway-bars, which ordinarily are continuations and form portions of the hounds of the wagon, are entirely avoided, and hence the frictional wear upon the reach which passes between these sway-bars, as ordinarily constructed, is done away with, while the fifth-wheel is free to perform its functions, and in the vibration or irregular movements of the forward axle such movement is communicated to the spring G, which entirely removes all strain upon the reach, excepting that which must necessarily follow its being the connecting-bar between the forward and rear axles of a wagon.

By the employment of the spring L and T-headed plate K upon the tongue-hounds the outer end of the tongue is retained in an elevated position at all times, relieving the horses from carrying the weight of the tongue upon their necks and avoiding the danger of galling them, which generally follows where the outer end of the tongue is supported by means of the neck-yoke and straps from the collar; and it will be observed that in placing the fifth-wheel below the forward axle and supporting substantially in the manner shown I materially strengthen the axle over those wherein the axle has to be cut away for the reception of the fifth-wheel and sway-bars.

What I claim as my invention is—

1. A wagon, and, in combination with the forward axle and reach thereof, the fifth-wheel E, secured to the spring G, for relieving the strain upon the reach, when constructed substantially in the manner set forth.

2. In combination with the axle A of a wagon, the fifth-wheel E, spring G, truss plate or bar F, guide-stop J, and the bar I, substantially as and for the purposes herein set forth.

3. In combination with the axle A and fifth-wheel E of a wagon, when constructed substantially as described, the T-headed plate K and spring L, when constructed, arranged, and operating substantially as and for the purposes specified.

AMOS BARNES.

Witnesses:
HARRY S. TEN EYCK,
JOHN FITZPATRICK,